July 14, 1942.   A. A. CAMPBELL   2,289,341
PRESSURE ALARM SYSTEM
Filed Dec. 30, 1940
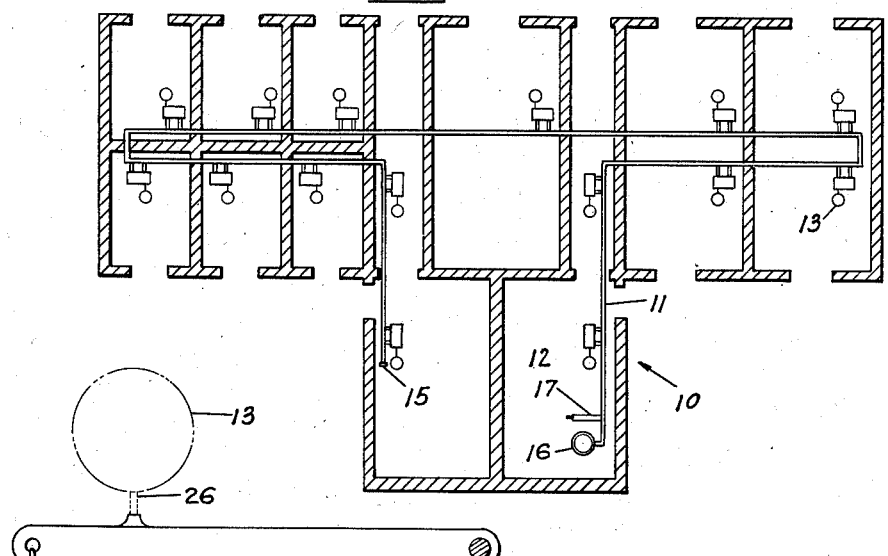
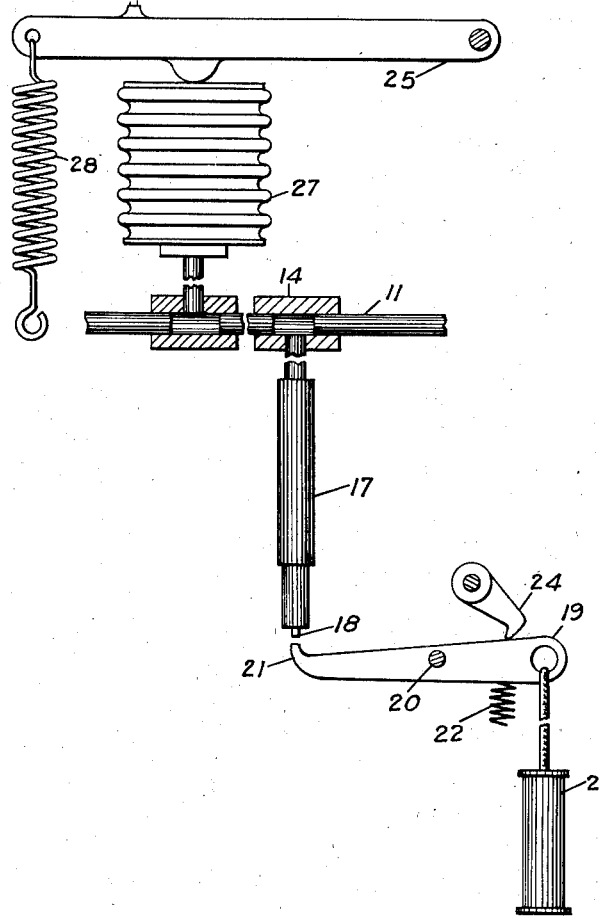
INVENTOR
Alvin A. Campbell
BY
ATTORNEY Patented July 14, 1942

2,289,341

UNITED STATES PATENT OFFICE 2,289,341

PRESSURE ALARM SYSTEM

Alvin A. Campbell, Hackettstown, N. J.

Application December 30, 1940, Serial No. 372,390

2 Claims. (Cl. 116—65)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an alarm system particularly adapted for installation and operation in buildings or other structures wherein explosives and/or explosive vapor are enclosed.

The principal object of the invention is to provide an alarm system that will not be dependent upon electric power for its energization, thereby eliminating a potential source of ignition of explosives and/or explosive vapors within the environment of the system during operation.

A further object of the invention is to provide a fluid pressure alarm system which is economical to install and maintain, simple in construction, positive in operation and wherein the ultra in safety is achieved from the standpoint of operation in an atmosphere saturated with explosive vapor or in the vicinity of explosives is concerned.

The specific nature of the invention as well as other objects and advantages thereof will clearly appear from a description of a preferred embodiment as shown in the accompanying drawing in which:

Fig. 1 is a sectional plan view of an explosives manufacturing plant showing the alarm system of this invention installed; and, Fig. 2 is a view in elevation partly in section showing an alarm unit held in inoperative position by the system of this invention.

As shown in the drawing, and more particularly in Fig. 1, the alarm system may be installed in any suitable building or structure generally indicated at 10 and comprises a tubular conduit 11 disposed to pass through each room or compartment 12 of the structure in such manner that an alarm 13 located in each or such of the rooms or compartments as desired may be operatively associated therewith as hereinafter described.

Conveniently the conduit 11 may be comprised of sections of copper tubing secured together in fluid sealed relation by means of brass jointure blocks 14 wherein adjacent ends of the sections are soldered. One end of the conduit 11 is sealed as indicated at 15 and the other end is secured to a suitable pressure gauge 16 which may be of the dial type. Adjacent the gauge 16, the conduit 11 has a valve 17 secured thereon provided with a valve core having a plunger 18 which is movable inwardly to open the vlave. The valve core may be of the conventional type employed in automobile tire valves and the plunger 18 will normally occupy the position shown in Fig. 2 in valve closing relation.

The valve plunger 18 may be moved to valve opening position by a lever 19 pivoted intermediate its ends on a pivot pin 20 and so disposed as to have one end 21 thereof adapted to engage and move the plunger inwardly of the valve upon clockwise movement of the lever as viewed in Fig. 2. The spring that normally retains the valve plunger 18 in the position shown in Fig. 2 may be of sufficient strength to prevent clockwise movement of lever 19 due to its own weight or a separate spring 22 may be used for such purpose. To facilitate manipulation of the lever 19 it is provided with a suitable hand grasp 23 and may be locked in valve opening position of the valve 17 by a pivoted locking pawl 24.

Each of the alarms 13 may be of the spring or weight loaded type arranged upon release of the weight or spring to sound the alarm. In the embodiment of the invention disclosed a release lever 25 pivoted adjacent one end portion to any suitable supporting structure is arranged to engage the spring or weight driven alarm member 26 of the alarm 13 adjacent its opposed end portion. A sylphon bellows 27 is connected to the conduit 11 in such manner as to be distended by a fluid in the conduit under pressure to engage and pivot the lever 25 to a position wherein the alarm member 26 will be blocked from operating movement or held in its fully retracted position operable to sound the alarm upon release of the lever. To ensure positive counterclockwise or releasing movement of the lever 25 upon release of the fluid under pressure in the conduit 11 a spring 28 may be attached to the lever 25 and any suitable support so loaded as to effect positive movement of the lever upon release of the fluid under pressure in the conduit.

Valves similar to the valve 17 and its associated releasing mechanism may be provided in the conduit 11 adjacent each of the alarms 13 or such of them as may be desired.

While the conduit 11 has been described as being formed of a specific material it is to be understood that such description is directed to a preferred embodiment of the invention and is not limitative in character.

In operation the conduit 11 will be charged with a suitable fluid through the valve 17 adjacent the gauge 16 until a pressure sufficient to distend and pivot the levers 25 to their uppermost positions, as shown in Fig. 2, has been built up, which may be determined by reading the pressure gauge previously calibrated for the purpose. If the structure 10 is not subjected to freezing temperatures the conduit 11 may be charged with air, however, if the structure 10 is subjected to freezing temperatures it is then preferred to charge the conduit 11 with a fluid that does not freeze at ordinary freezing temperatures, such for example, as glycerine.

When it is desired to sound the alarm it is only necessary to pivot one or more of the levers 19 about their pivots in a clockwise direction, as viewed in Fig. 2, until the plungers 18 of the valve cores are moved inwardly of the valve stems to valve opening position, in which positions the levers 19 are automatically locked by the pawls 24. Opening of one or more of the valves 17 will release the fluid under pressure in conduit 11 thereby permitting contraction of the bellows 27 and rotation of the levers 25 under the influence of springs 28 to release the alarm members 26 which will then be driven by suitable springs or weights to sound the alarms 13.

Having now described a present preferred embodiment of the invention I claim:

1. An alarm system comprising a single closed fluid conduit passing through the various alarm stations, a pressure gage at one end of the conduit, a valve secured to the conduit at each alarm station for introducing or releasing a fluid thereinto or therefrom respectively at will, an alarm at each alarm station, a blocking member on each alarm having one position in which operation of the alarm is prevented and another position in which operation of the alarm is permitted, a lever at each alarm station pivoted adjacent one end and engaging the blocking member, means for each lever to normally bias the lever away from the blocking member, a bellows for each alarm station connected to the conduit and adapted when distended to bias the lever toward the blocking member to move the member into position to prevent operation of the alarm, and a manually operable lever at each alarm station to engage the valve to release fluid from the conduit whereby each lever is moved away from its blocking member to permit simultaneous operation of all the alarms.

2. An alarm system comprising a single closed fluid conduit passing through the various alarm stations, an alarm at each alarm station, a blocking member on each alarm having one position in which operation of the alarm is prevented and another position in which operation of the alarm is permitted, a lever at each alarm station pivoted adjacent one end and engaging the blocking member, means for each lever to normally bias the lever away from the blocking member, a pressure sensitive device for each alarm station connected to the conduit and adapted when under pressure to bias the lever toward the blocking member to move the member into position to prevent operation of the alarm, a valve at each alarm station to permit the release of pressure fluid from the conduit at will, a lever at each alarm station engageable with the valve and actuable into fluid releasing position, and means to automatically lock the lever in fluid releasing position once it has been moved into that position.

ALVIN A. CAMPBELL.